(12) United States Patent
Ruhlander

(10) Patent No.: US 6,748,820 B2
(45) Date of Patent: Jun. 15, 2004

(54) SELF-ADJUSTING ISOLATOR FOR REDUCING CABLE LASH IN TRANSMISSION SHIFT SYSTEMS

(75) Inventor: Gregory Phillip Ruhlander, Hannibal, MO (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 69 days.

(21) Appl. No.: 10/037,196

(22) Filed: Nov. 9, 2001

(65) Prior Publication Data

US 2002/0104402 A1 Aug. 8, 2002

Related U.S. Application Data

(60) Provisional application No. 60/248,355, filed on Nov. 9, 2000.

(51) Int. Cl.[7] .................................................. F16C 1/10
(52) U.S. Cl. ..................... 74/502.4; 74/500.5; 403/141; 403/335
(58) Field of Search .............................. 74/502.4, 502.6, 74/502, 500.5, 501.5 R, 503, 473.29, 511 R; 403/11, 18, 361, 122, 316, 335, 141, 163

(56) References Cited

U.S. PATENT DOCUMENTS

| | | | | |
|---|---|---|---|---|
| 3,853,414 A | * | 12/1974 | Hirano et al. .................. 403/71 |
| 4,327,600 A | * | 5/1982 | Bennett ....................... 74/502.4 |
| 4,406,177 A | * | 9/1983 | Bennett et al. ............. 74/500.5 |
| 4,520,689 A | * | 6/1985 | Sucro et al. .................... 74/595 |
| 4,534,239 A | * | 8/1985 | Heimann .................... 74/502.4 |
| 4,581,953 A | | 4/1986 | Walston ..................... 74/501 R |
| 4,625,579 A | * | 12/1986 | Spease ....................... 74/502.4 |
| 4,694,705 A | * | 9/1987 | Frankhouse et al. ........ 74/500.5 |
| 4,726,251 A | * | 2/1988 | Niskanen ....................... 74/502 |
| 4,763,541 A | * | 8/1988 | Spease ....................... 74/500.5 |
| 4,887,930 A | * | 12/1989 | Chaczyk et al. ........... 403/379.2 |
| 4,951,524 A | * | 8/1990 | Niskanen .................... 74/502.4 |
| 4,955,252 A | * | 9/1990 | Clissett et al. .............. 74/502.4 |
| 5,003,838 A | * | 4/1991 | Pospisil et al. ............. 74/502.4 |
| 5,027,673 A | * | 7/1991 | Behrens et al. ............. 74/473.1 |
| 5,161,428 A | * | 11/1992 | Petruccello ................. 74/502.4 |
| 5,207,116 A | * | 5/1993 | Sultze ........................ 74/502.4 |
| 5,220,832 A | * | 6/1993 | Petruccello ................. 74/502.4 |
| 5,265,495 A | * | 11/1993 | Bung et al. ................. 74/502.6 |
| 5,448,926 A | * | 9/1995 | Reasoner .................... 74/500.5 |
| 5,582,074 A | * | 12/1996 | Kelley et al. .............. 74/502.4 |
| 5,605,074 A | * | 2/1997 | Hall et al. .................. 74/502.6 |
| 5,634,379 A | * | 6/1997 | Barnard ...................... 74/502.6 |
| 5,709,132 A | * | 1/1998 | Irish et al. ................. 74/502.4 |
| 5,724,858 A | * | 3/1998 | Polando ..................... 74/502.6 |
| 5,823,063 A | * | 10/1998 | Nagle et al. ............... 74/502.6 |
| 5,862,710 A | | 1/1999 | Koenig ....................... 74/502.4 |
| 5,884,531 A | | 3/1999 | Koenig ....................... 74/502.4 |
| 5,934,150 A | * | 8/1999 | Srinivas et al. ............ 74/502.4 |
| 5,988,011 A | * | 11/1999 | Crepin ....................... 74/502.4 |
| 6,021,689 A | * | 2/2000 | Moore ........................ 74/502.6 |
| 6,098,489 A | * | 8/2000 | Van Zanten et al. ........ 74/502.6 |
| 6,102,609 A | * | 8/2000 | Tsuge ......................... 403/301 |
| 6,109,132 A | * | 8/2000 | Frye ........................... 74/502.4 |

* cited by examiner

*Primary Examiner*—David A. Bucci
*Assistant Examiner*—Julie K. Smith
(74) *Attorney, Agent, or Firm*—Richard M. Mescher; Casimir R. Kiczek

(57) ABSTRACT

A terminal assembly for connecting a core member of a remote control cable assembly to a control member includes a housing, an isolator secured to the housing with a snap-fit connection and having a deflectable wall at least partially forming a passage for receiving the control member, an adjuster movable between an installed position wherein the adjuster prevents outward deflection of the wall away from the passage and an uninstalled position wherein the wall is free to outwardly deflect away from the passage. The adjuster is secured to the isolator with a snap-fit connection in the installed position. The isolator includes a flange within the passage which is adapted to cooperate with the control member to secure the control member to the isolator when the adjuster is in the installed position. The isolator has an annularly-shaped recess adapted to receive at least a portion of the adjuster therein when the adjuster is in the installed position such that the adjuster blocks outward deflection of the wall when the adjuster is in the installed position. The adjuster is generally tubularly-shaped such that the adjuster is at least partially received in the recess when the adjuster is in the installed position and has a wedge-shaped inner surface adapted to deflect the wall toward the passage when the adjuster is in the installed position.

19 Claims, 5 Drawing Sheets

SELF-ADJUSTING ISOLATOR FOR REDUCING CABLE LASH IN TRANSMISSION SHIFT SYSTEMS

CROSS-REFERENCE TO RELATED APPLICATIONS

This application claims the benefit of U.S. Provisional Patent Application No. 60/248,355 filed Nov. 9, 2000.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a motion-transmitting remote control cable assembly and, more particularly, to a terminal or rod-end assembly of a cable assembly of the type used in transmission shift systems.

BACKGROUND OF THE INVENTION

Motion-transmitting remote control cable assemblies, sometimes referred to as "Bowden cables" or "push-pull cables", are used for transmitting both force and travel along a curved path in aircraft, automotive, and marine environments. Known cable assemblies can be used for transmitting load and motion in both push and pull type applications. In the automotive environment, typical applications include but are not limited to parking brakes, accelerators, hood releases, brake releases, trunk releases, park lock, tilt wheel controls, fuel filler doors, transmission shifter cables, and hydraulic control cables. One specific use of such remote control cable assemblies is positioning transmission shift members in automobiles.

A motion-transmitting remote control cable assembly for transmitting motion along a curved path typically includes a flexible core element (strand) slidably enclosed within a flexible outer sheath (conduit) with end fittings attached to both ends of each respective member. These fittings attach to and react load from the conduit to its mounting points and from the strand to its mounting points. The core element is adapted at one end to be attached to a member to be controlled whereas the other end is attached to an actuator for longitudinally moving the core element within the outer sheath. The outer sheath is adapted to be secured by the fittings to a support structure.

The strands of these motion-transmitting cable assemblies are often secured to components by a terminal or rod-end assembly. These components can have a relatively large tolerance range such as, for example, pins of automobile transmission shift systems. As a result of this large tolerance range, there can be a difference in fit between the terminal assembly and the pin which produces a gap such that there can be relative movement between the fitting and the pin (lash). This lash causes inaccuracy in the shift system throughout its full range. Additionally, these known terminal assemblies typically have large installation loads, that is the forces required to attach the terminal assembly to the pin or other component, in order to obtain high extraction loads, that is the forces required to inadvertently remove the terminal assembly from the pin or other component. Accordingly, there is a need in the art for an improved fitting for a motion transmitting remote control cable assembly which accounts for large tolerance ranges of mating components to reduce lash therebetween during operation and/or requires relatively low installation loads while maintaining relatively high extraction loads.

SUMMARY OF THE INVENTION

The present invention provides a terminal or rod-end assembly of a motion-transmitting remote-control cable assembly which overcomes at least some of the above-noted problems of the related art. According to the present invention, a terminal assembly for connecting a core member of a remote control cable assembly to a control member comprises, in combination, a housing, an isolator secured to the housing and having a deflectable wall at least partially forming a passage for receiving the control member, and an adjuster. The adjuster is movable between an installed position wherein the adjuster prevents outward deflection of the wall away from the passage and an uninstalled position wherein the wall is free to outwardly deflect away from the passage.

According to another aspect of the present invention, a connection between a terminal assembly of a remote control cable assembly and a control member comprises, in combination, a control member, a housing, an isolator secured to the housing and having a deflectable wall at least partially forming a passage for receiving the control member, and an adjuster. The adjuster is movable between an installed position wherein the adjuster engages the wall and deflects the wall into engagement with the control member to secure the control member to the isolator and an uninstalled position wherein the wall is deflectable away from the passage so that the control member can be selectively inserted into the passage and removed from the passage.

According to yet another aspect of the present invention, a terminal assembly for connecting a core member of a remote control cable assembly to a control member includes a housing, an isolator secured to the housing with a snap-fit connection and having a deflectable wall at least partially forming a passage for receiving the control member, an adjuster movable between an installed position wherein the adjuster prevents outward deflection of the wall away from the passage and an uninstalled position wherein the wall is free to outwardly deflect away from the passage. The adjuster is secured to the isolator with a snap-fit connection in the installed position. The isolator includes a flange within the passage which is adapted to cooperate with the control member to secure the control member to the isolator when the adjuster is in the installed position. The isolator has an annularly-shaped recess adapted to receive at least a portion of the adjuster therein when the adjuster is in the installed position such that the adjuster blocks outward deflection of the wall when the adjuster is in the installed position. The adjuster is generally tubularly-shaped such that the adjuster is at least partially received in the recess when the adjuster is in the installed position and has a wedge-shaped inner surface adapted to deflect the wall toward the passage when the adjuster is in the installed position.

From the foregoing disclosure and the following more detailed description of various preferred embodiments it will be apparent to those skilled in the art that the present invention provides a significant advance in the technology of motion-transmitting remote-control cable assemblies. Particularly significant in this regard is the potential the invention affords for providing a high quality, reliable, low lash, high extraction load/low installation load, easily assembled and disassembled, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
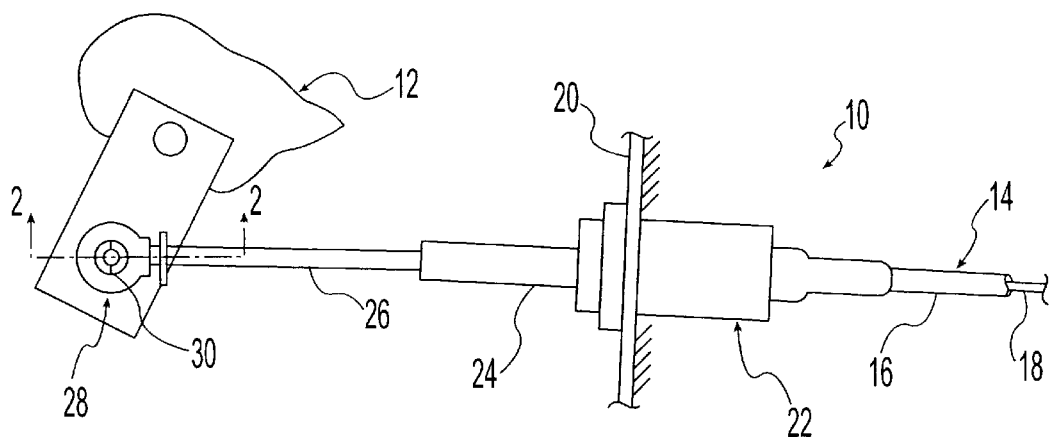
FIG. 1 is a perspective view of a motion-transmitting remote control cable assembly for a transmission shift system according a preferred embodiment of the present invention

It should be understood that the appended drawings are not necessarily to scale, presenting a somewhat simplified representation of various preferred features illustrative of the basic principles of the invention. The specific design features of the remote-control cable assembly as disclosed herein, including, for example, specific dimensions, orientations, and shapes of the isolator and adapter ring will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the remote control cable assemblies illustrated in the drawings. In general, up or upward refers to an upward direction in the plane of the paper in FIG. 1 and down or downward refers to a downward direction in the plane of the paper in FIG. 1. Also in general, fore or forward refers to a direction toward the front of the motor vehicle and aft or rearward refers to a direction toward the rear of the motor vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved motion-transmitting remote control cable assemblies disclosed herein. The following detailed discussion of various alternative and preferred embodiments will illustrate the general principles of the invention with reference to a remote control cable assembly for use with a motor vehicle transmission shifter system. Other embodiments suitable for other applications will be apparent to those skilled in the art given the benefit of this disclosure.

The term "snap-fit" connection is used herein and in the claims to mean a connection between at least two components wherein at least one of the components has a protrusion and/or abutment which engages the other component to form an interlock or interference which retains the components together when they are connected and at least one of the components has a resiliently deformable or deflectable portion such that the deflectable portion deflects to remove the interference as the parts are brought together and resiliently snaps back to reform the interference when the components are together. The term "unitary" member is used herein and in the claims to mean a member made of a single continuous material. The term "integral" members is used herein and in the claims to mean members that are secured together such as, for example, two members connected by overmolding.

Referring now to the drawings, FIG. 1 shows a remote control cable assembly 10 for a transmission shift assembly 12 of a motor vehicle, such as an automobile, according to a preferred embodiment of the present invention. While the illustrated embodiments of the present invention are particularly adapted for use with an automobile, it is noted that the present invention can be utilized with any motor vehicle having a control cable including trucks, buses, vans, recreational vehicles, earth moving equipment and the like, off road vehicles such as dune buggies and the like, air borne vehicles, and water borne vehicles. While the illustrated embodiments of the present invention are particularly adapted for use with a transmission shift assembly 12, it is also noted that the present invention can be utilized with other motor vehicle systems such as, for example, the parking brake, accelerator, hood release, brake release, trunk release, park lock, tilt wheel control, fuel filler door, and hydraulic control cables. While the illustrated embodiments of the present invention are particularly adapted for the transmission end of the cable in the transmission shift assembly 12, it is further noted that features of the present invention can be utilized at the shifter end of the cable in the transmission shift assembly.

As shown in FIG. 1, the remote control cable assembly 10 includes flexible cable having a flexible outer sheath or conduit member 16 and a flexible inner core or strand member 18 longitudinally slidable within the conduit member 16. The conduit member 16 is secured to a rigid structure 20 by a conduit end fitting 22 such as, for example, the conduit end fittings disclosed in U.S. Pat. Nos. 5,862,710 and 5,884,531, the disclosures of which are expressly incorporated herein in their entirety by reference. The conduit end fitting 22 typically includes a tube member or other guide means 24 which is preferably connected by a swivel joint to allow for swiveling movement of the tube member 24 relative to the conduit member 22. The strand member 18 is connected to a rod member 26 of a terminal or rod-end assembly 28 described in more detail hereinbelow. The strand member 18 can be secured to the rod member 26 in any suitable manner such as, for example, staking or crimping. The rod member 26 longitudinally moves within the tube member 24 to define a line of force as the rod member 26 is actuated to axially move into and out of the tube member 24. The terminal assembly 28 is connected to a control component or member 30, such as the illustrated transmission pin, to be actuated such that movement of the strand member 18 and rod member 26 actuates the control member 30.

Figure 2:
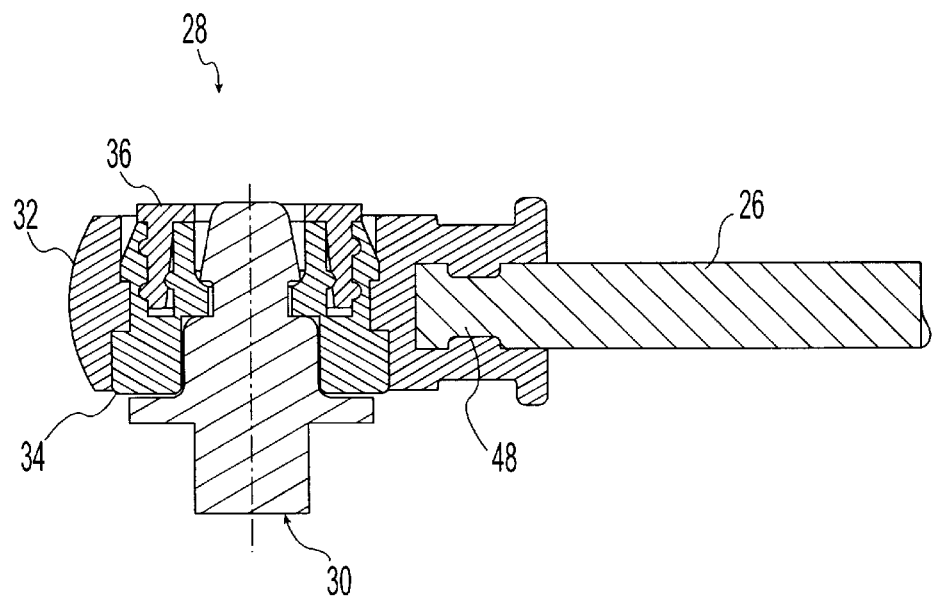
FIG. 2 is an enlarged cross-sectional view of a terminal or rod-end assembly of the remote control cable assembly of FIG. 1 taken along line 2—2 of FIG. 1.

As best shown in FIG. 2, the illustrated terminal or rod-end assembly 28 includes the rod member 26, a housing 32 which is integrally connected to the rod member 26, an isolator 34 secured to the housing 32 to interface with the control member 30 such as the illustrated transmission pin, and an adjuster 36 to selectively lock the isolator 34 to the control member 30.

Figure 11:
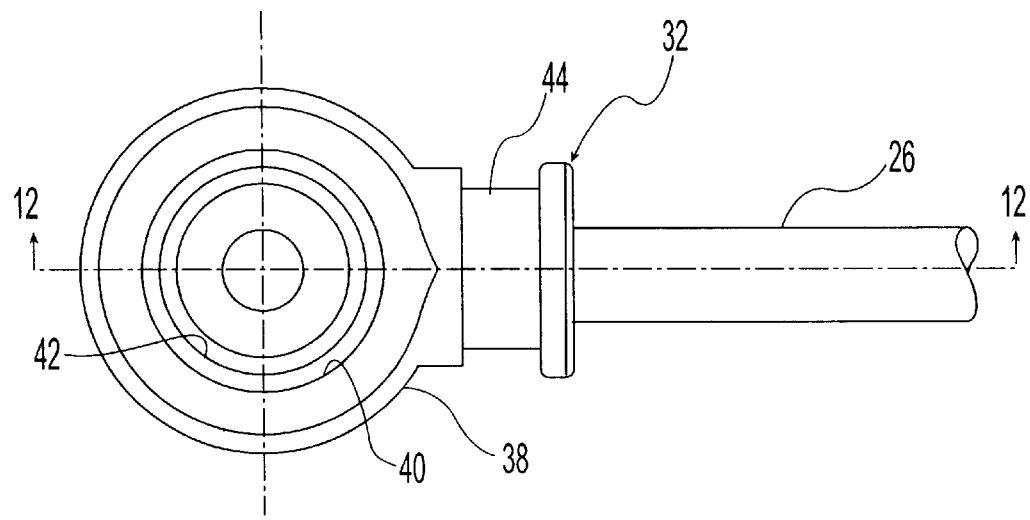
FIG. 11 is a top view of a housing and rod of the terminal assembly of FIG. 2.
Figure 12:
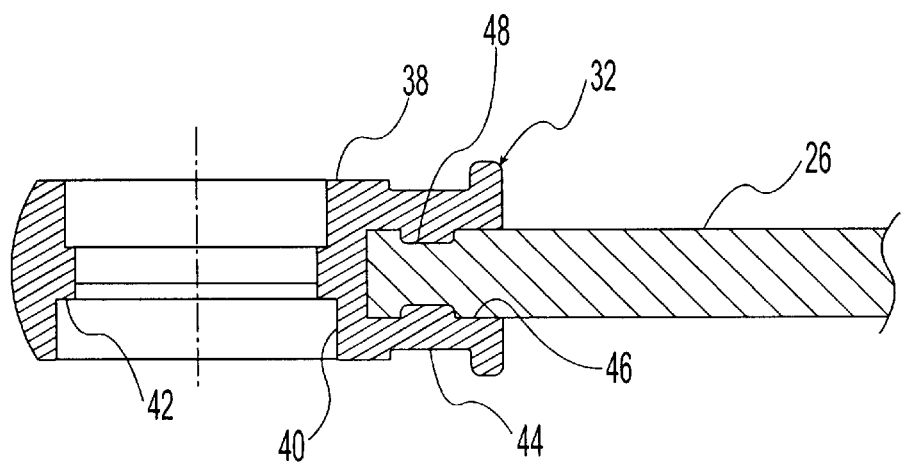
FIG. 12 is a cross-sectional view of the housing and pin of FIG. 11 taken along line 12—12 of FIG. 11.

As best shown in FIGS. 2, 11, and 12, the housing 32 has a generally cylindrically-shaped main portion 38 having a main passage 40 axially-extending therethrough. Located within the passage is a radially inwardly extending flange 42 sized and shaped to cooperate with the isolator 34 as described in more detail hereinafter. The flange 42 forms opposed, outwardly facing, annularly shaped, planar, first and second engagement surfaces. The housing 32 also has a rod-connecting portion 44 which is preferably unitary with the main portion 38. The illustrated rod-connecting portion 44 is generally cylindrically shaped and substantially perpendicularly extending from the outer side of the main portion 38. The rod-securing portion 44 has an axially-extending blind passage 46 which is sized and shaped for receiving the end of the rod member 26. The rod member 26 is rigidly secured to the rod-connecting portion 44 such that the rod member 26 is unitary with the housing 32. Preferably, the housing 32 is overmolded onto the end of the rod member 26. The rod member 26 is preferably provided with a circumferentially-extending groove 48 spaced from the end of the rod member 26 to improve retention of the rod member 26 with the housing 32. The housing 32 can be formed of any suitable material such as, for example, a plastic material.

As best shown in FIGS. 3–6, the illustrated isolator 34 is generally cylindrically-shaped having a main passage 50 axially-extending therethrough. Located within the passage 50 is a radially inwardly extending flange 52 sized and shaped to cooperate with the transmission pin 30 as described in more detail hereinafter. The flange 52 forms opposed, outwardly facing, annularly shaped, first and second engagement surfaces. The first engagement surface is substantially planar while the second engagement surface is generally arcuate having a radius of curvature selected to cooperate with the transmission pin 30 as described in more detail hereinafter. Formed in the end of the isolator 36 is an annularly-shaped blind recess 54 to form spaced-apart and coaxial inner and outer walls 56, 58. The inner and outer walls 56, 58 are preferably flexible, that is, deflectable about their attachment point in the manner of a living hinge. Outwardly extending from the inner wall 56 into the recess 54 is a "positive force" rib 60 which is sized and shaped to engage the adjuster 36 as described in more detail hereinafter. The illustrated rib 60 extends about the entire periphery of the inner wall 56 and is generally arcuate or hemispherically-shaped in cross-section. The outer wall 58 is provided with a pair of axially spaced apart locking recesses 62, 64 within the annular recess 54. The locking recesses 62, 64 are sized and shaped to cooperate with the adjuster 36 to lock the adjuster 36 in a desired position relative to the isolator 34 with a snap-fit connection as described in more detail hereinafter. The illustrated recesses 62, 64 extend about the entire circumference of the outer wall 58 and are generally arcuate or hemispherically-shaped in cross section. The outer surface of the isolator 34 is provided with a recess 66 which is sized and shaped to cooperate with the flange 42 of the housing 32 to secure the isolator 34 to the housing 32 with a snap-fit connection. The illustrated recess 66 extends the entire circumference of the isolator 34 and is generally rectangular in cross section. The recess 66 forms first and second annularly-shaped planar engagement surfaces which face towards each other and cooperate with the engagement surfaces of the housing flange 42 to retain the isolator 34 to the housing 32 within the passage 40. The isolator 32 can be formed of any suitable material such as, for example, a flexible plastic material or elastomer material. Preferably the isolator material has vibration isolation properties and/or can easily receive lubricants. A suitable material for the isolator 34 is believed to be a Urethane.

As best shown in FIGS. 3, 4, 7, and 8, the illustrated adjuster 36 is generally tubular-shaped and sized for receipt within the annular recess 54 of the isolator 34. Located at the outer end of the adjuster 36 are inner and outer flanges 68, 70 which substantially perpendicularly extend therefrom. The inner and outer flanges 68, 70 are sized and shaped to engage the ends of the inner and outer walls 56, 58 of the isolator 34 to limit insertion of the adjuster 36 into the annular recess 54. The outer surface of the adjuster 36 is provided with a pair of axially-spaced apart outwardly extending locking protrusions 72, 74 which are sized, shaped, and located to cooperate with the locking recesses 62, 64 in the isolator outer wall 58 to lock the adjuster 36 in a desired position relative to the isolator 34 with a snap fit connection. The illustrated locking protrusions 72, 74 extend about the entire periphery of the adjuster 36 and are generally arcuate or hemispherical-shaped in cross-section. It is noted that other forms of snap-fit connections can be provided between the adjuster 36 and the isolator 34 such as, for example, the protrusions 72, 74 can be on the isolator 34 and the recesses 62, 64 on the adjuster 36 and/or the protrusions 72, 74 and recesses 62, 64 can have other shapes or sizes.

Figure 3:
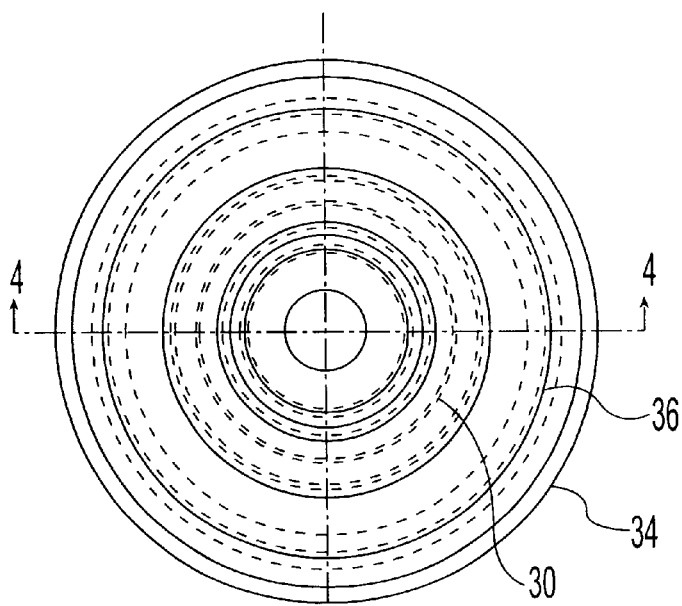
FIG. 3 is an enlarged end view of connection between a transmission pin and the terminal end fitting of FIG. 2, with components removed for clarity.
Figure 4:
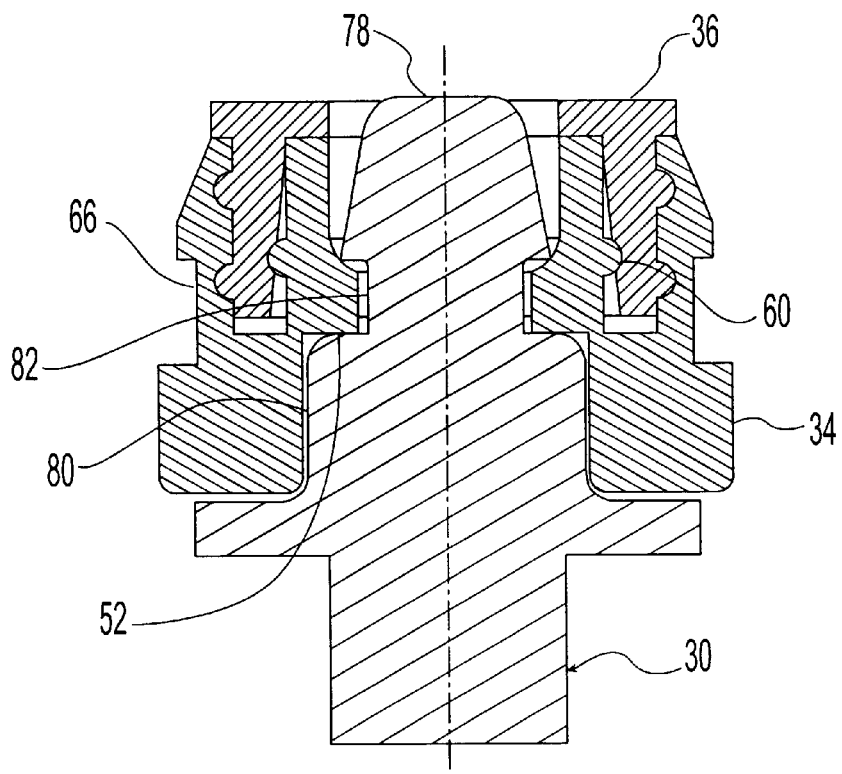
FIG. 4 is an enlarged cross-sectional view of the transmission pin and terminal assembly of FIG. 3 taken along line 4—4 of FIG. 3.
Figure 5:
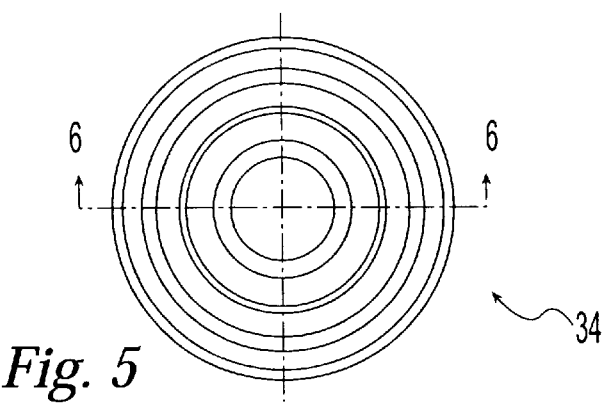
FIG. 5 is an end view of an isolator of the terminal assembly of FIG. 3.
Figure 6:
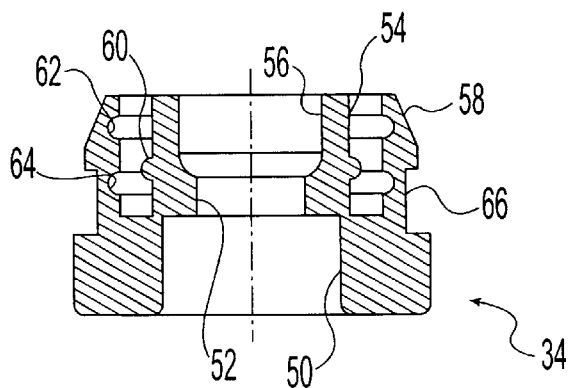
FIG. 6 is a cross-sectional view of the isolator of FIG. 5 taken along line 6—6 of FIG. 5.
Figure 7:
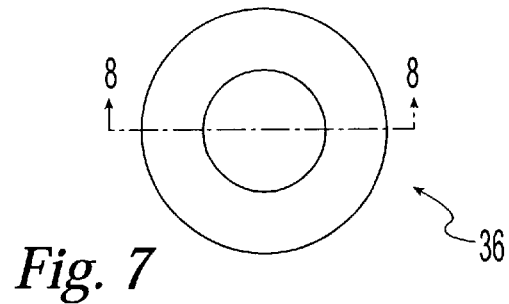
FIG. 7 is an end view of an adjuster of the terminal assembly of FIG. 3.
Figure 8:
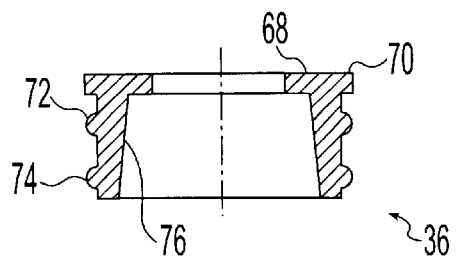
FIG. 8 is a cross-sectional view the adjuster of FIG. 7 taken along line 8—8 of FIG. 7.

The inner surface 76 of the adjuster 36 is adapted to engage the rib 60 of the isolator inner wall 56 and inwardly deflect the inner wall 56 as necessary to engage the engagement surfaces of the inner wall 56 with the transmission pin 30 to limit relative movement or lash between the transmission pin 30 and the isolator 34. The illustrated adjuster 36 is generally wedge-shaped such that the inner wall 56 is increasingly deflected in a radially inward direction as the adjuster 34 is inserted into the isolator annular recess 54. The adjuster 36 and the isolator rib 60 are sized such that there is an interference between the rib 60 and the adjuster 36 over the entire tolerance range of the transmission pin 30 when the adjuster 36 is in its locked position as shown in FIGS. 2–4. The adjuster 36 can be formed of any suitable material such as, for example, a plastic material. A suitable material for the adjuster 36 is believed to be a glass filled Nylon or other hard plastic.

Figure 9:
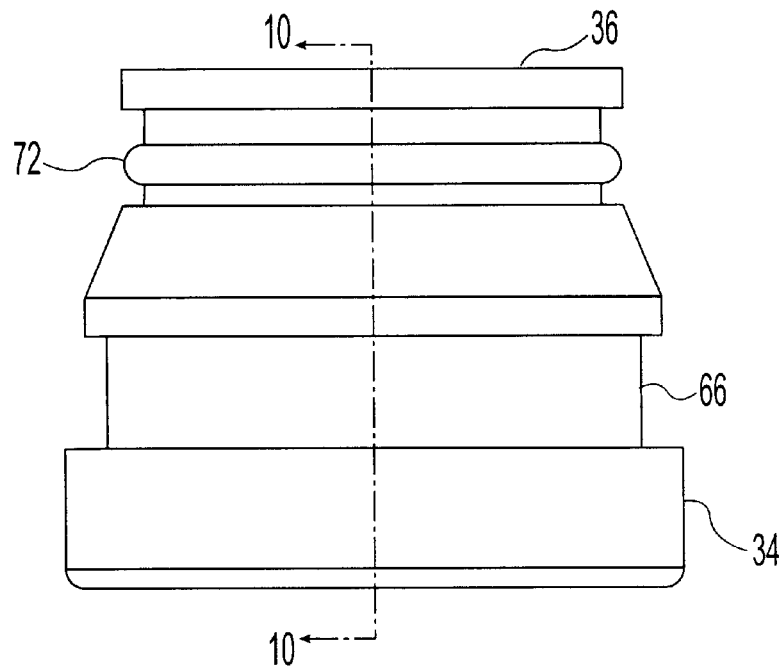
FIG. 9 is a side view of the terminal assembly of FIG. 3, wherein the transmission pin is not inserted and the adjuster is shown in a shipping or unlocked position.
Figure 10:
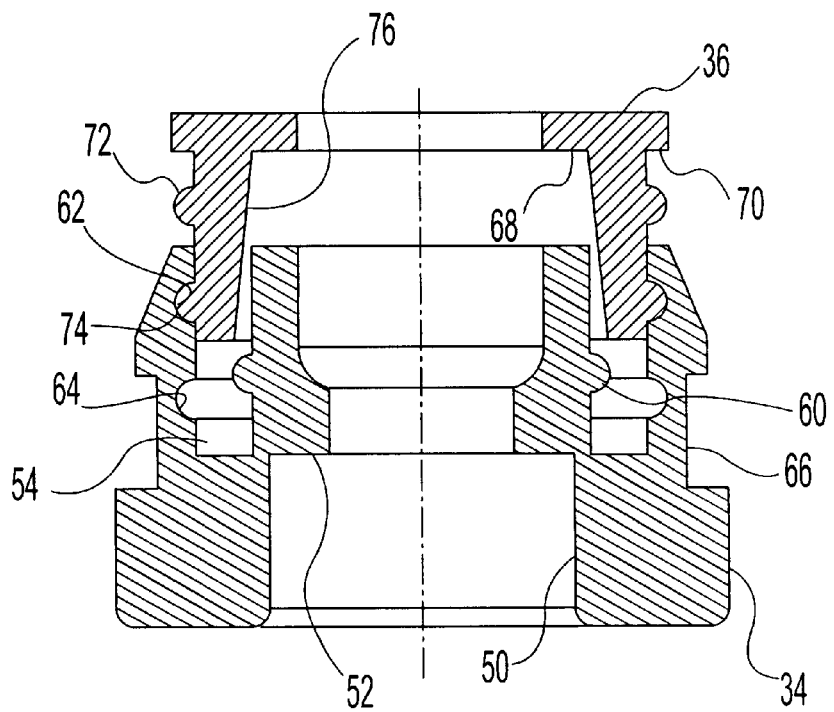
FIG. 10 is a cross-sectional view of the terminal assembly of FIG. 9 taken along line 10—10 of FIG. 9.

Preferably, at least the outer most locking protrusion 74 is adapted to cooperate with either of the locking recesses 62, 64 so that the isolator 36 can be snap-fit locked into either of two selected positions relative to the isolator 34: a locked or installed position as shown in FIGS. 2–4 wherein both locking protrusions 72, 74 are engaged in the locking recesses 62, 64 so that the adjuster 36 engages the isolator rib 60 and forces the inner wall 56 and/or flange 52 against the pin 30 and prevents outward deflection of the isolator inner wall 56; and a shipping or uninstalled position as shown in FIGS. 9 and 10 wherein only the outer most locking protrusion 74 engages the outer most locking recess 62 so that the adjuster 36 does not engage the rib 60 and the isolator inner wall 56 is outwardly deflectable. In each of the two positions the adjuster 36 is locked to the isolator 34 with a snap-fit connection. While the illustrated isolator 34 and adjuster 36 are formed as separate completely removable parts, it is noted that they can alternatively be formed as unitary member or integral members as long as the adjuster 36 can be moved between the positions. If the isolator 34 and the adjuster 36 were secured in another manner, the snap fit connection in the shipping position would not be necessary.

The illustrated transmission pin or control member 30 has a head portion 78 and a body portion 80. Between the head and body portions 78, 80 is a circumferentially-extending recess 82. The recess 82 forms a pair of planar, annularly-shaped engagement surfaces which face toward each other. The isolator flange 52 is sized for insertion into the recess 82 such that engagement between the flange 52 and the surfaces of the recess 82 securely locks the transmission pin 30 in the isolator 34.

To install the terminal assembly 28 to the transmission pin 30, the adjuster 36 is positioned in the uninstalled position (best shown in FIGS. 10 and 11). The pin 30 is inserted into the passage 50 of the isolator 34 and as the pin head portion 78 engages the isolator flange 52, the inner wall 56 of the isolator 34 outwardly deflects as the head portion 78 passes thereby until the isolator flange 52 is received in the transmission pin recess 82. It is noted that the flange 52 may also deflect as the pin head portion 78 passes thereby. Once the isolator flange 52 is received in the transmission pin recess 82, the adjuster 36 is moved from the uninstalled position to the installed position (best shown in FIGS. 2–4). As the adjuster 36 is moved to the installed position, the adjuster angled inner surface 76 engages the isolator rib 60 and inwardly deflects the isolator upper wall 56 until the isolator flange 52 engages the transmission pin 30 to eliminate substantially all relative movement or lash between the isolator 34 and the transmission pin 30. Once snapped into the installed position, the adjuster 36 is secured in position relative to the isolator 34 and substantially prevents outward deflection of the isolator inner wall 56. Therefore, it can be appreciated that a substantially higher extraction load for the pin 30 is required than the insertion load for the pin 30.

It is apparent from the foregoing disclosure that the terminal assembly of the present invention not only eliminates or minimizes lateral lash, that is lateral relative movement between the control member and the isolator, but also eliminates or minimizes travel along the axis of the control member, that is the control member cannot axially move relative to the isolator. It should also be appreciated that the housing and isolator are adapted so that the control member can only be installed in one direction, that is the correct direction, thus eliminating the possibility of an assembly error of inserting the control member in the wrong direction.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the adjuster 36 and/or isolator 34 can each have many different configurations and can be formed of many different materials. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A terminal assembly for connecting a core member of a remote control cable assembly to a transmission pin comprising, in combination:
   a terminal having a housing forming a main passage and a rod rigidly secured to the housing for connection to the core member;
   an isolator secured to the housing within the main passage and having a deflectable inner wall at least partially forming a pin passage for receiving the transmission pin;
   wherein the pin passage has a central longitudinal axis;
   an adjuster movable between an installed position wherein the adjuster prevents outward deflection of the inner wall away from the pin passage and an uninstalled position wherein the inner wall is free to outwardly deflect away from the pin passage;
   wherein the isolator is formed of a vibration isolating material and the vibration isolating material is flexible relative to a rigid material forming the adjustor;
   wherein the isolator has an outer wall spaced apart from the inner wall to form an annularly-shaped recess coaxial with the pin passage and adapted to receive at least a portion of the adjuster therein when the adjuster is in the installed position;
   wherein the adjuster is generally tubularly-shaped and coaxial with the recess such that the adjuster is at least partially received in the recess when the adjuster is in the installed position; and
   wherein the adjuster axially moves along the central longitudinal axis between the uninstalled position and the installed position.

2. The terminal assembly according to claim 1, wherein the isolator is secured to the housing with a snap-fit connection.

3. The terminal assembly according to claim 1, wherein the adjuster is secured to the isolator with a snap-fit connection in the installed position.

4. The terminal assembly according to claim 1, wherein the adjuster blocks outward deflection of the inner wall when the adjuster is in the installed position.

5. The terminal assembly according to claim 1, wherein the isolator includes a flange within the pin passage and adapted to cooperate with the transmission pin to secure the transmission pin to the isolator when the adjuster is in the installed position.

6. The terminal assembly according to claim 5, wherein the flange has an arcuate surface adapted to engage the transmission pin.

7. The terminal assembly according to claim 1, wherein the isolator and the adjuster are provided with a cooperating rib and recess to secure the isolator within the recess with a snap-fit connection when the adjuster is in the installed position.

8. The terminal assembly according to claim 1, wherein the adjuster has a wedge-shaped inner surface adapted to deflect the inner wall toward the pin passage when the adjuster is in the installed position.

9. The terminal assembly according to claim 8, wherein the isolator has a rib at the wall and adapted to engage the wedge shaped surface when the adjuster is in the installed position.

10. The terminal assembly according to claim 1, wherein the adjuster has a wedge-shaped surface adapted to deflect the inner wall toward the pin passage when the adjuster is in the installed position.

11. The terminal assembly according to claim 1, wherein the isolator has a rib at the inner wall and adapted to engage the adjuster when the adjuster is in the installed position.

12. A connection between a terminal assembly of a remote control cable assembly and a transmission pin comprising, in combination:

a transmission pin;

a terminal having a housing forming a main passage and a rod rigidly secured to the housing;

an isolator secured to the housing within the main passage and having a deflectable wall at least partially forming a pin passage receiving the transmission pin and adapted to cooperate with the transmission pin to selectively secure the transmission pin to the isolator;

an adjuster movable between an installed position wherein the adjuster engages the wall and deflects the wall into engagement with the transmission pin to secure the transmission pin to the isolator and an uninstalled position wherein the wall is deflectable away from the passage so that the transmission pin can be selectively inserted into the pin passage and removed from the pin passage;

wherein the isolator is formed of a vibration isolating material and the vibration isolating material is flexible relative to a rigid material forming the adjustor; and wherein the adjuster deflects the deflectable wall into engagement with the transmission pin in the installed position to prevent movement between the isolator and the transmission pin, wherein the isolator has another wall spaced apart from the deflectable wall to form an annularly-shaped recess adapted to receive at least a portion of the adjuster therein when the adjuster is in the installed position.

13. The connection according to claim 12, wherein the isolator includes a flange within the pin passage and adapted to cooperate with the transmission pin to secure the transmission pin to the isolator when the adjuster is in the installed position.

14. The connection according to claim 1, wherein the adjuster blocks outward deflection of the wall when the adjuster is located in the recess.

15. The connection according to claim 1, wherein the adjuster is generally tubularly-shaped such that the adjuster is at least partially received in the recess when the adjuster is in the installed position.

16. A terminal assembly for connecting a core member of a remote control cable assembly to a transmission pin comprising, in combination:

a terminal having a housing forming a main passage and a rod rigidly secured to the housing for connection to the core member;

an isolator secured to the housing with a snap-fit connection and having a deflectable inner wall at least partially forming a pin passage for receiving the transmission pin;

wherein the pin passage has a central longitudinal axis;

an adjuster axially movable along the central longitudinal axis of the pin passage between an installed position wherein the adjuster prevents outward deflection of the inner wall away from the pin passage and an uninstalled position wherein the inner wall is free to outwardly deflect away from the pin passage;

wherein the isolator is formed of a vibration isolating material and the vibration isolating material is flexible relative to a rigid material forming the adjustor;

wherein the adjuster is secured to the isolator with a snap-fit connection in the installed position;

wherein the isolator includes a flange within the pin passage and adapted to cooperate with the transmission pin to secure the transmission pin to the isolator when the adjuster is in the installed position;

wherein the isolator has an outer wall spaced apart from the inner wall to form an annularly-shaped recess coaxial with the pin passage and adapted to receive at least a portion of the adjuster therein when the adjuster is in the installed position such that the adjuster blocks outward deflection of the inner wall when the adjuster is in the installed position; and wherein the adjuster is generally tubularly-shaped and coaxial with the recess such that the adjuster is at least partially received in the recess when the adjuster is in the installed position and has a wedge-shaped inner surface adapted to deflect the inner wall toward the pin passage when the adjuster is in the installed position.

17. The terminal assembly according to claim 1, wherein the adjuster deflects the deflectable inner wall into engagement with the transmission pin in the installed position to prevent movement between the isolator and the transmission pin.

18. The connection according to claim 12, wherein the pin passage has a central longitudinal axis and the adjuster axially moves along the central longitudinal axis between the uninstalled position and the installed position.

19. The connection according to claim 18, wherein the isolator has another wall spaced apart from the deflectable wall to form an annularly-shaped recess coaxial with the passage and the adjuster is generally tubularly-shaped and coaxial with the recess such that the adjuster is at least partially received in the recess when the adjuster is in the installed position.

* * * * *